United States Patent
Im et al.

(10) Patent No.: US 11,088,721 B2
(45) Date of Patent: Aug. 10, 2021

(54) DEVICE FOR OPERATING NAVIGATION SATELLITE ON BASIS OF CODE DIVISION TRANSMISSION ARRAY ANTENNA AND METHOD FOR OPERATING NAVIGATION SATELLITE

(71) Applicant: KOREA AEROSPACE RESEARCH INSTITUTE, Daejeon (KR)

(72) Inventors: Sung Hyuck Im, Daejeon (KR); Se Bum Chun, Daejeon (KR); Moon Beom Heo, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/627,749

(22) PCT Filed: Aug. 13, 2018

(86) PCT No.: PCT/KR2018/009245
§ 371 (c)(1),
(2) Date: Dec. 30, 2019

(87) PCT Pub. No.: WO2019/050179
PCT Pub. Date: Mar. 14, 2019

(65) Prior Publication Data
US 2021/0075466 A1  Mar. 11, 2021

(30) Foreign Application Priority Data

Sep. 8, 2017  (KR) .................. 10-2017-0114881

(51) Int. Cl.
*H04B 1/69* (2011.01)
*H04B 7/185* (2006.01)
(52) U.S. Cl.
CPC ........... *H04B 1/69* (2013.01); *H04B 7/18513* (2013.01); *H04B 2001/6904* (2013.01)

(58) Field of Classification Search
CPC .................. H04B 1/69; H04B 7/18513; H04B 2001/6904
See application file for complete search history.

(56) References Cited

U.S. PATENT DOCUMENTS 6,140,976 A * 10/2000 Locke .................... H01Q 3/267
342/173
2007/0184849 A1 * 8/2007 Zheng .................. H04B 7/0626
455/456.1

FOREIGN PATENT DOCUMENTS

EP  3 120 165 B1  10/2017
JP  4668842 B2   4/2011
(Continued)

OTHER PUBLICATIONS

Sung-Hyuck Im et al., "Feasibility Study of Pseudolite Techniques Using Signal Transmission Delay and Code Offset", XP002619718, pp. 798-803, ION 2009 International Technical Meeting, Jan. 26-28, 2009, Anaheim, CA.

*Primary Examiner* — Sam K Ahn
*Assistant Examiner* — Amneet Singh
(74) *Attorney, Agent, or Firm* — Winston Hsu

(57) ABSTRACT

The present invention relates to a device for operating a navigation satellite on the basis of a code division transmission array antenna and a method for operating a navigation satellite. The device for operating a navigation satellite on the basis of a code division transmission array antenna, according to the present invention, comprises: a code generation unit for allocating a spread spectrum code to each of a plurality of antennas; a determination unit for determining, as transmission-end antennas, at least some of the plurality of antennas, to which different spread spectrum codes are allocated; and a processing unit, which arranges each of the transmission-end antennas at predetermined coordinates such that a plurality of signals transmitted from the trans- (Continued)

mission-end antennas are transmitted to reception-end antennas through multiple paths.

12 Claims, 5 Drawing Sheets

(56) References Cited

FOREIGN PATENT DOCUMENTS

| KR | 10-2011-0018257 A | 2/2011 |
| KR | 10-1179701 B1 | 9/2012 |
| KR | 10-1227911 B1 | 2/2013 |
| KR | 10-1502400 B1 | 3/2015 |
| WO | 2007/084681 A1 | 7/2007 |

\* cited by examiner

DEVICE FOR OPERATING NAVIGATION SATELLITE ON BASIS OF CODE DIVISION TRANSMISSION ARRAY ANTENNA AND METHOD FOR OPERATING NAVIGATION SATELLITE

BACKGROUND OF THE INVENTION

1. Field of the Invention

The following description relates to a device for operating a navigation satellite based on a code division transmission array antenna and a method for operating a navigation satellite.

2. Description of the Prior Art

In a related art, a global navigation satellite system (GNSS) has been used by an array antenna scheme using a single spread spectrum signal. In other words, the GNSS in the related art have been used by transmitting navigation signals from an orbit (space) to the ground. A user (receiver) on the ground may receive the navigation signals to determine a location and a time.

However, a large number of obstacles such as buildings or structures exist on the ground, and a multipath error may occur due to the obstacles. When a multipath error occurs, an accuracy in determining of a location is easily reduced in the GNSS in the related art. To overcome such an issue, a user-centered array antenna is used in the related art, but it is difficult to carry an array antenna because a size of the array antenna increases due to characteristics of the array antenna. Also, it is very difficult to process signals using the array antenna in the related art.

Thus, there is a need for a technology of implementing an array antenna transmission scheme with different spread spectrum signals for each antenna in a transmission end.

SUMMARY OF THE INVENTION

The present disclosure has been made to solve the above problems, and an aspect is to process array antenna signals in a reception-end antenna without a multipath error by allocating different spread spectrum codes for each antenna when configuring transmission-end antennas and by transmitting signals using the transmission-end antennas as array antennas with different spread spectrum signals.

Technical Solution

According to an aspect, a navigation satellite operating device based on a code division transmission array antenna includes a code generation unit configured to allocate a spread spectrum code to each of a plurality of antennas, a determination unit configured to determine, as transmission-end antennas, at least a portion of antennas, to which different spread spectrum codes are allocated, among the plurality of antennas, and a processing unit configured to arrange each of the transmission-end antennas at predetermined coordinates such that a plurality of signals transmitted from the transmission-end antennas are transmitted to a reception-end antenna through multiple paths.

According to another aspect, a navigation satellite operating method based on a code division transmission array antenna includes allocating a spread spectrum code to each of a plurality of antennas, determining, as transmission-end antennas, at least a portion of antennas, to which different spread spectrum codes are allocated, among the plurality of antennas, and arranging each of the transmission-end antennas at predetermined coordinates such that a plurality of signals transmitted from the transmission-end antennas are transmitted to a reception-end antenna through multiple paths.

Effect of the Invention

According to example embodiments, it is possible to process array antenna signals in a reception-end antenna without a multipath error by allocating different spread spectrum codes for each antenna when configuring transmission-end antennas and by transmitting signals using the transmission-end antennas as array antennas with different spread spectrum signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
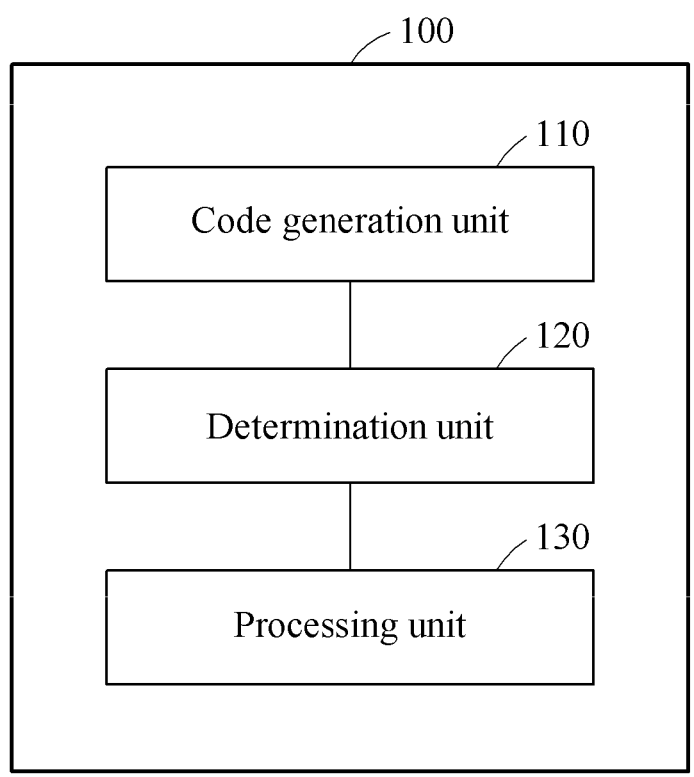
FIG. 1 is a block diagram illustrating a navigation satellite operating device based on a code division transmission array antenna according to an example embodiment.

Hereinafter, example embodiments will be described in detail with reference to the accompanying drawings. The present disclosure, however, should not be construed as limited to the example embodiments set forth herein. Regarding the reference numerals assigned to the elements in the drawings, it should be noted that the same elements will be designated by the same reference numerals.

In the present disclosure, a code division transmission array antenna-based navigation satellite operating device and navigation satellite operating method will be described.

FIG. 1 is a block diagram illustrating a navigation satellite operating device based on a code division transmission array antenna according to an example embodiment.

A navigation satellite operating device 100 based on the code division transmission array antenna (hereinafter, referred to as the "navigation satellite operating device 100") may include a code generation unit 110, a determination unit 120 and a processing unit 130.

The code generation unit 110 allocates a spread spectrum code to each of a plurality of antennas. For example, the code generation unit 110 may allocate different spread spectrum codes to antennas. Also, the code generation unit 110 may allocate the same spread spectrum code to a portion of the plurality of antennas and allocate different spread spectrum codes to the other antennas. For example, a spread spectrum code may be C/A, P, and the like. At least two antennas may be provided, and accordingly at least two spread spectrum codes may also be provided.

The determination unit 120 determines, as transmission-end antennas, at least a portion of antennas, to which different spread spectrum codes are allocated, among the plurality of antennas. For example, the determination unit 120 may determine antennas matched to different spread spectrum codes as transmission-end antennas. For example, when different spread spectrum codes are allocated to a first antenna, a second antenna, . . . , and a seventh antenna, the determination unit 120 may determine the first antenna, the second antenna and a third antenna as transmission-end antennas, may determine the first antenna, the third antenna, a sixth antenna and the seventh antenna as transmission-end antennas, or may determine all the antennas as transmission-end antennas.

Also, when a plurality of antennas are determined as transmission-end antennas, the determination unit 120 may determine coordinates such that a first transmission-end antenna among the transmission-end antennas may be enclosed by a second transmission-end antenna that is one of transmission-end antennas other than the first transmission-end antenna. For example, the determination unit 120 may determine coordinates such that the other transmission-end antennas may be arranged around the first transmission-end antenna. For example, the determination unit 120 may determine coordinates such that the second transmission-end antenna, a third transmission-end antenna and a fourth transmission-end antenna may enclose the first transmission-end antenna.

Also, the determination unit 120 may determine a direction angle of the transmission-end antenna at the coordinates based on a position and attitude of a satellite associated with the transmission-end antenna. For example, when coordinates of a transmission-end antenna are determined, the determination unit 120 may determine a direction angle of the transmission-end antenna at the determined coordinates. In this example, the determination unit 120 may determine the direction angle based on, for example, the position and the attitude of the satellite and a position of a reception-end antenna. Since the position and the attitude of the satellite may be acquired at an extremely accurate level, the direction angle of the transmission-end antenna may be extremely easily processed.

Figure 2A:
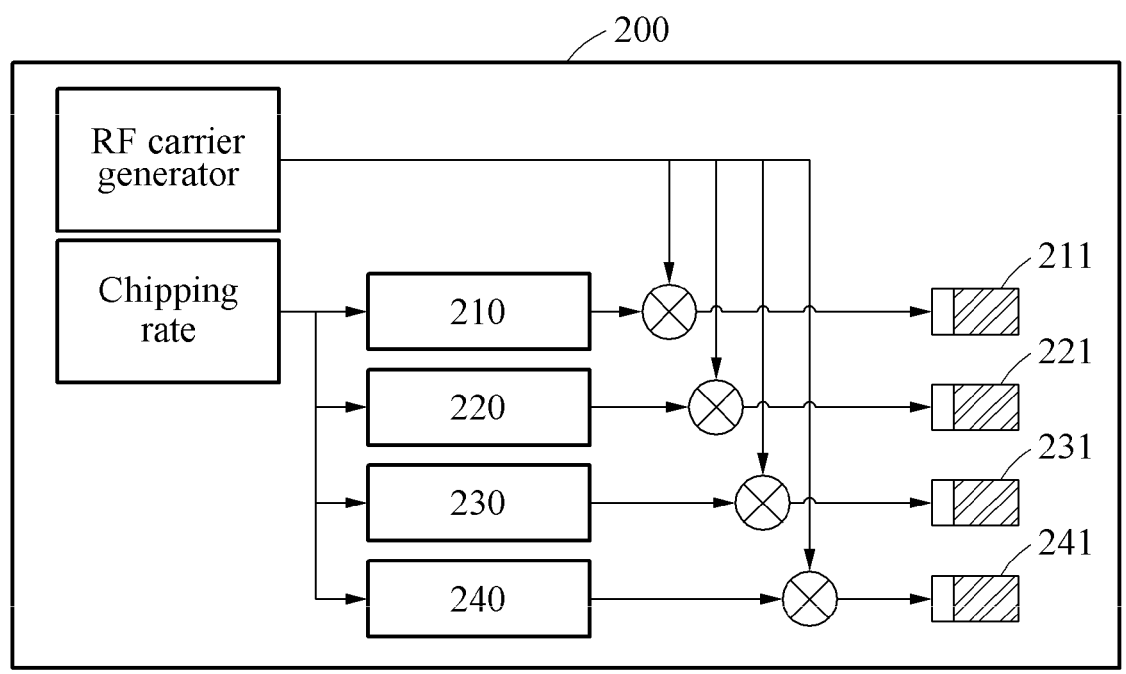
FIGS. 2A and 2B illustrate examples of implementing a navigation satellite operating device for a configuration of a transmission-end antenna according to an example embodiment.
Figure 2B:
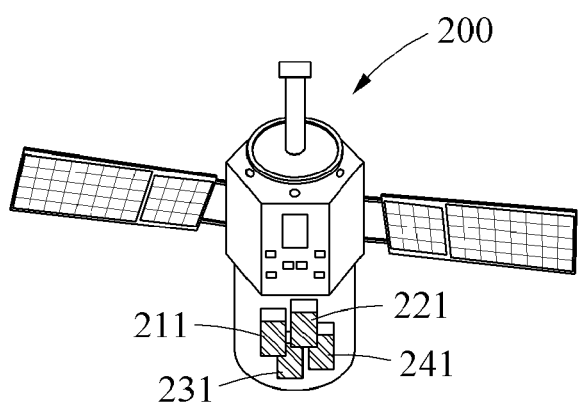

FIGS. 2A and 2B illustrate examples of implementing a navigation satellite operating device for a configuration of a transmission-end antenna according to an example embodiment.

Referring to FIG. 2A, a navigation satellite operating device 200 includes a plurality of code generation units, for example, code generation units 210, 220, 230 and 240, and a plurality of antennas, for example, antennas 211, 221, 231 and 241. Also, the navigation satellite operating device 200 further includes an RF carrier generator and a chipping rate which are connected to the code generation units 210, 220, 230 and 240 and the antennas 211, 221, 231 and 241 to control a configuration of antennas. Although four antennas are provided in FIG. 2A, example embodiments are not limited thereto.

The navigation satellite operating device 200 may determine, as transmission-end antennas, a portion or all of the antennas 211, 221, 231 and 241 to which codes are allocated by the code generation units 210, 220, 230 and 240.

As shown in FIG. 2B, the navigation satellite operating device 200 may be included in an artificial satellite. For example, the navigation satellite operating device 200 may be mounted and implemented in the artificial satellite together with the plurality of antennas 211, 221, 231 and 241.

Figure 3:
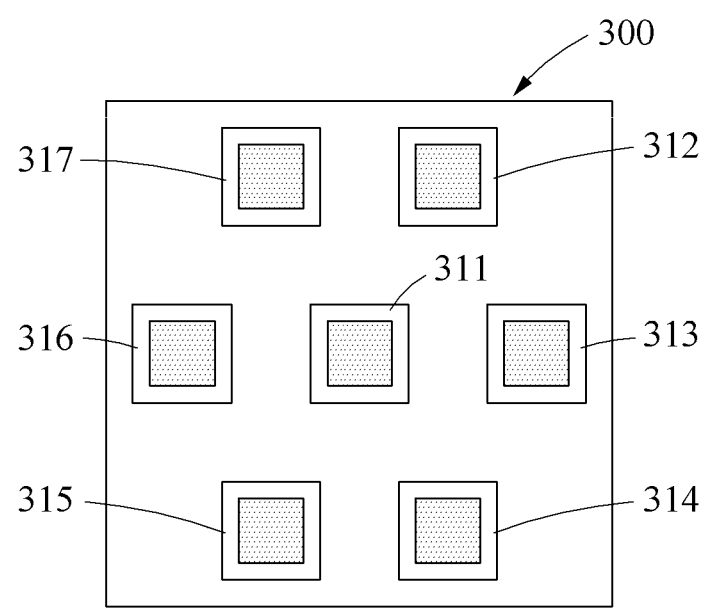
FIG. 3 illustrates an example of a configuration of a transmission-end antenna according to an example embodiment.

FIG. 3 illustrates an example of a configuration of a transmission-end antenna according to an example embodiment.

Referring to FIG. 3, a transmission-end antenna 300 of a navigation satellite operating device may include a first antenna 311, a second antenna 312, a third antenna 313, a fourth antenna 314, a fifth antenna 315, a sixth antenna 316 and a seventh antenna 317. The transmission-end antenna 300 of the navigation satellite operating device may determine a portion of the above seven antennas, that is, the first antenna 311, the second antenna 312, . . . , and the seventh antenna 317, as transmission-end antennas 300 based on codes allocated to the seven antennas.

Referring back to FIG. 1, the determination unit 120 may deactivate a portion of remaining antennas to which the same spread spectrum code is allocated among the plurality of antennas, and may limit a signal transmission to the reception-end antenna. For example, the determination unit 120 may distinguish antennas with the same spread spectrum code from antennas with different spread spectrum codes among antennas to which spread spectrum codes are allocated, and may temporarily deactivate the antennas with the same spread spectrum code. For example, when different spread spectrum codes are allocated to a first antenna, a second antenna and a third antenna, and when the same spread spectrum code is allocated to a fourth antenna and a fifth antenna, the determination unit 120 may deactivate the fourth antenna and the fifth antenna and may limit a signal transmission.

Also, the determination unit 120 may limit a multipath error cancellation function by the reception-end antenna, by encrypting a portion of the plurality of signals transmitted from the transmission-end antennas. For example, the determination unit 120 may encrypt a portion of array antenna signals to limit the multipath error cancellation function and a jamming response function. In an example embodiment, a signal error (that is, an error occurring when a plurality of signals are transmitted to a reception-end antenna through multiple paths) caused by multiple paths may temporarily limit the multipath error cancellation function at the reception-end antenna through an encryption of a portion of the signals if necessary in a signal processing of the reception-end antenna.

The processing unit 130 arranges each of the transmission-end antennas at predetermined coordinates and allows a plurality of signals transmitted from the transmission-end antennas to be transmitted to a reception-end antenna through multiple paths. For example, the processing unit 130 may arrange a plurality of transmission-end antennas at predetermined coordinates to transmit signals to a single reception-end antenna. Thus, it is possible to obtain an effect of using an array antenna despite a single reception-end antenna.

Also, the processing unit 130 may operate all the transmission-end antennas arranged at the coordinates as an array antenna, such that each of the plurality of signals may be sequentially transmitted to the reception-end antenna. For example, the processing unit 130 may operate antennas determined and arranged as transmission-end antennas among the plurality of antennas as an array antenna. In this example, the processing unit 130 may allow signals to be sequentially transmitted from the transmission-end antennas such that the signals may be transmitted.

Also, the reception-end antenna may be a single antenna, and may receive the plurality of signals through the multiple paths at the same time. For example, the reception-end antenna may include a single antenna configured to sequentially receive a plurality of signals at the same time when the signals are transmitted through multiple paths. Although the reception-end antenna is a single antenna, the transmission-end antennas use different spread spectrum codes, and thus the reception-end antenna may have an effect of using an array antenna.

Figure 4:
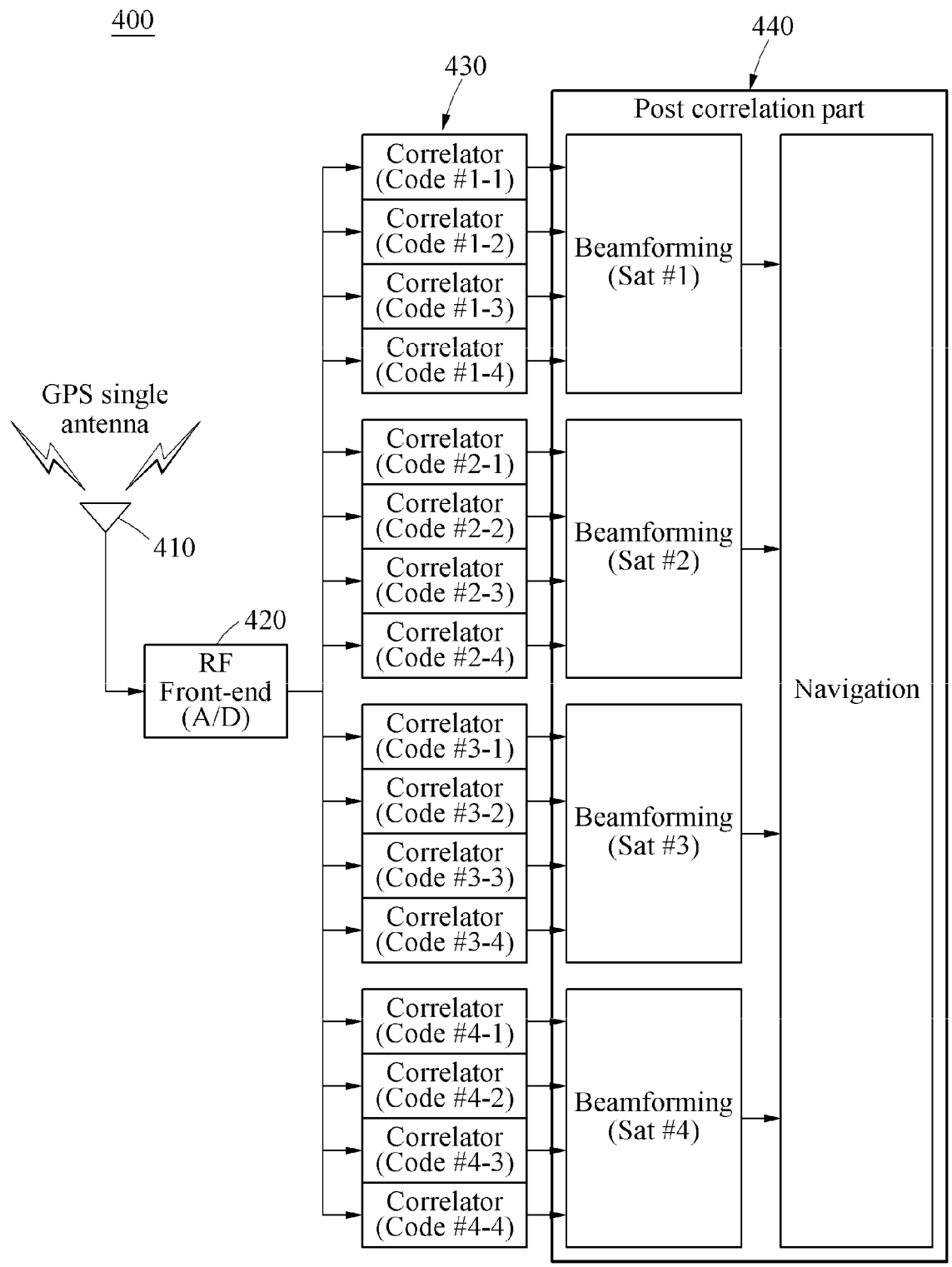
FIG. 4 illustrates an example of implementing a reception-end antenna according to an example embodiment.

FIG. 4 illustrates an example of implementing a reception-end antenna according to an example embodiment.

A navigation satellite operating system 400 based on the navigation satellite operating device 100 may transmit a transmission signal to a reception-end antenna 410. The reception-end antenna 410 may be a single antenna, and an application of a reception array antenna scheme may be possible using the single antenna. For example, the reception-end antenna 410 may use receiver hardware devices 420, 430 and 440 included therein without a change, and may be used by merely changing firmware.

The above-described navigation satellite operating device 100 may allocate different spread spectrum codes for each antenna when configuring transmission-end antennas and transmit signals using the transmission-end antennas as array antennas with different spread spectrum signals, thereby processing array antenna signals in the reception-end antenna without a multipath error.

Figure 5:
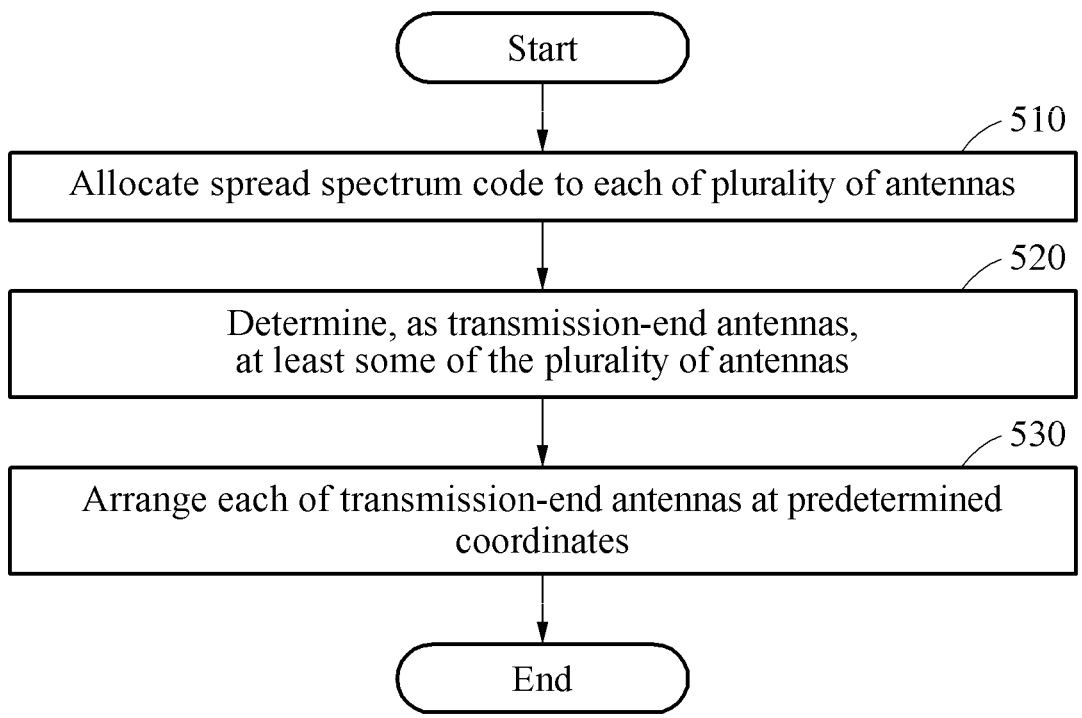
FIG. 5 is a flowchart illustrating a navigation satellite operating method based on a code division transmission array antenna according to an example embodiment.

FIG. 5 is a flowchart illustrating a navigation satellite operating method based on a code division transmission array antenna according to an example embodiment.

The navigation satellite operating method based on the code division transmission array antenna may be performed by the above-described navigation satellite operating device 100.

In operation 510, the navigation satellite operating device 100 allocates a spread spectrum code to each of a plurality of antennas. Operation 510 may be a process of allocating different spread spectrum codes to antennas. Also, the navigation satellite operating device 100 may allocate the same spread spectrum code to a portion of the plurality of antennas and allocate different spread spectrum codes to the other antennas. For example, a spread spectrum code may be C/A, P, and the like. At least two antennas may be provided, and accordingly at least two spread spectrum codes may also be provided.

In operation 520, the navigation satellite operating device 100 determines, as transmission-end antennas, at least a portion of antennas, to which different spread spectrum codes are allocated, among the plurality of antennas. Operation 520 may be, for example, a process of determining antennas matched to different spread spectrum codes as transmission-end antennas. For example, when different spread spectrum codes are allocated to a first antenna, a second antenna, . . . . , and a seventh antenna, the navigation satellite operating device 100 may determine the first antenna, the second antenna and a third antenna as transmission-end antennas, may determine the first antenna, the third antenna, a sixth antenna and the seventh antenna as transmission-end antennas, or may determine all the antennas as transmission-end antennas.

In operation 530, the navigation satellite operating device 100 arranges each of the transmission-end antennas at predetermined coordinates such that a plurality of signals transmitted from the transmission-end antennas are transmitted to a reception-end antenna through multiple paths. Operation 530 may be, for example, a process of arranging a plurality of transmission-end antennas at predetermined coordinates to transmit signals to a single reception-end antenna. Thus, it is possible to obtain an effect of using an array antenna despite a single reception-end antenna.

Depending on example embodiments, when a plurality of antennas are determined as transmission-end antennas, the navigation satellite operating device 100 may determine coordinates such that a first transmission-end antenna among the transmission-end antennas may be enclosed by a second transmission-end antenna that is one of transmission-end antennas other than the first transmission-end antenna. For example, the navigation satellite operating device 100 may determine coordinates such that the other transmission-end antennas may be arranged around the first transmission-end antenna. For example, the navigation satellite operating device 100 may determine coordinates such that the second transmission-end antenna, a third transmission-end antenna and a fourth transmission-end antenna may enclose the first transmission-end antenna.

Depending on example embodiments, navigation satellite operating device 100 may determine a direction angle of the transmission-end antenna at the coordinates based on a position and attitude of a satellite associated with the transmission-end antenna. For example, when coordinates of a transmission-end antenna are determined, the navigation satellite operating device 100 may determine a direction angle of the transmission-end antenna at the determined coordinates. In this example, the navigation satellite operating device 100 may determine the direction angle based on, for example, the position and the attitude of the satellite and a position of a reception-end antenna. Since the position and the attitude of the satellite may be acquired at an extremely accurate level, the direction angle of the transmission-end antenna may be extremely easily processed.

Depending on example embodiments, the navigation satellite operating device 100 may operate all the transmission-end antennas as an array antenna, and may allow each of the plurality of signals to be sequentially transmitted to the reception-end antenna. For example, the navigation satellite operating device 100 may operate antennas determined and arranged as transmission-end antennas among the plurality of antennas as an array antenna. In this example, the navigation satellite operating device 100 may allow signals to be sequentially transmitted from the transmission-end antennas such that the signals may be transmitted.

Also, the reception-end antenna may be a single antenna, and may receive the plurality of signals through the multiple paths at the same time. For example, the reception-end antenna may include a single antenna configured to sequentially receive a plurality of signals at the same time when the signals are transmitted through multiple paths. Although the reception-end antenna is a single antenna, the transmission-end antennas use different spread spectrum codes, and thus the reception-end antenna may have an effect of using an array antenna.

Depending on example embodiments, the navigation satellite operating device 100 may deactivate a portion of remaining antennas to which the same spread spectrum code is allocated among the plurality of antennas, and may limit a signal transmission to the reception-end antenna. For example, the navigation satellite operating device 100 may distinguish antennas with the same spread spectrum code from antennas with different spread spectrum codes among antennas to which spread spectrum codes are allocated, and may temporarily deactivate the antennas with the same spread spectrum code. For example, when different spread spectrum codes are allocated to a first antenna, a second antenna and a third antenna, and when the same spread spectrum code is allocated to a fourth antenna and a fifth antenna, the navigation satellite operating device 100 may deactivate the fourth antenna and the fifth antenna and may limit a signal transmission.

Depending on example embodiments, the navigation satellite operating device 100 may limit a multipath error cancellation function by the reception-end antenna, by encrypting a portion of the plurality of signals transmitted from the transmission-end antennas. For example, the navigation satellite operating device 100 may encrypt a portion of array antenna signals to limit the multipath error cancellation function and a jamming response function. In an example embodiment, a signal error (that is, an error occurring when a plurality of signals are transmitted to a reception-end antenna through multiple paths) caused by multiple paths may temporarily limit the multipath error cancellation function at the reception-end antenna through an encryption of a portion of the signals if necessary in a signal processing of the reception-end antenna.

Using the above-described navigation satellite operating method, it is possible to process array antenna signals in the reception-end antenna without a multipath error by allocating different spread spectrum codes for each antenna when configuring transmission-end antennas and transmitting signals using the transmission-end antennas as array antennas with different spread spectrum signals.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A navigation satellite operating device based on a code division transmission array antenna, the navigation satellite operating device comprising:
   a code generation circuit configured to allocate a spread spectrum code to each of a plurality of antennas;
   a determination circuit configured to determine, as transmission-end antennas, at least a portion of antennas, to which different spread spectrum codes are allocated, among the plurality of antennas; and
   a processing circuit configured to arrange each of the transmission-end antennas at predetermined coordinates such that a plurality of signals transmitted from the transmission-end antennas are transmitted to a reception-end antenna through multiple paths, wherein the processing circuit deactivates a portion of remaining antennas to which the same spread spectrum code is allocated among the plurality of antennas and limits a signal transmission to the reception-end antenna.

2. The navigation satellite operating device of claim 1, wherein when a plurality of antennas are determined as the transmission-end antennas, the determination circuit determines coordinates such that a first transmission-end antenna among the transmission-end antennas is enclosed by a second transmission-end antenna that is one of transmission-end antennas other than the first transmission-end antenna.

3. The navigation satellite operating device of claim 1, wherein the determination circuit determines a direction angle of each of the transmission-end antennas at the coordinates based on a position and attitude of a satellite associated with the transmission-end antennas.

4. The navigation satellite operating device of claim 1, wherein the processing circuit operates all the transmission-end antennas arranged at the coordinates as an array antenna such that the plurality of signals are sequentially transmitted to the reception-end antenna.

5. The navigation satellite operating device of claim 1, wherein the reception-end antenna includes a single antenna and receives the plurality of signals at the same time through the multiple paths.

6. The navigation satellite operating device of claim 1, wherein the processing circuit limits a multipath error cancellation function by the reception-end antenna by encrypting a portion of the plurality of signals transmitted from the transmission-end antennas.

7. A navigation satellite operating method based on a code division transmission array antenna, the navigation satellite operating method comprising:
   allocating a spread spectrum code to each of a plurality of antennas;
   determining, as transmission-end antennas, at least a portion of antennas, to which different spread spectrum codes are allocated, among the plurality of antennas;

arranging each of the transmission-end antennas at predetermined coordinates such that a plurality of signals transmitted from the transmission-end antennas are transmitted to a reception-end antenna through multiple path; and deactivating a portion of remaining antennas to which the same spread spectrum code is allocated among the plurality of antennas and limiting a signal transmission to the reception-end antenna.

8. The navigation satellite operating method of claim 7, further comprising:

when a plurality of antennas are determined as the transmission-end antennas, determining coordinates such that a first transmission-end antenna among the transmission-end antennas is enclosed by a second transmission-end antenna that is one of transmission-end antennas other than the first transmission-end antenna.

9. The navigation satellite operating method of claim 7, further comprising:

determining a direction angle of each of the transmission-end antennas at the coordinates based on a position and attitude of a satellite associated with the transmission-end antennas.

10. The navigation satellite operating method of claim 7, further comprising:

operating all the transmission-end antennas arranged at the coordinates as an array antenna such that the plurality of signals are sequentially transmitted to the reception-end antenna.

11. The navigation satellite operating method of claim 7, wherein the reception-end antenna includes a single antenna and receives the plurality of signals at the same time through the multiple paths.

12. The navigation satellite operating method of claim 7, further comprising:

limiting a multipath error cancellation function by the reception-end antenna by encrypting a portion of the plurality of signals transmitted from the transmission-end antennas.

\* \* \* \* \*